June 22, 1948.　　　A. G. GUZIK　　　2,443,955
DEVICE FOR USE IN RETREADING AND
VULCANIZING PNEUMATIC TIRE
Filed April 16, 1946　　　3 Sheets-Sheet 3
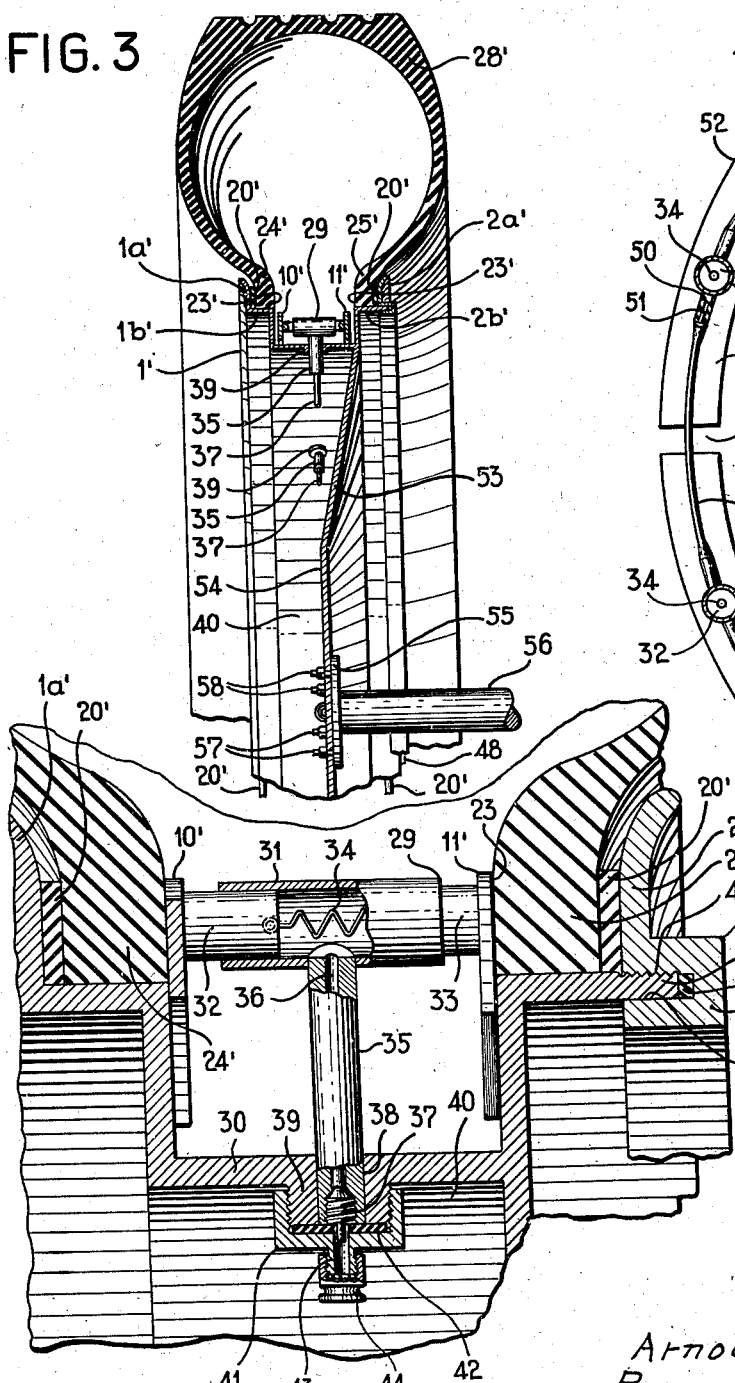
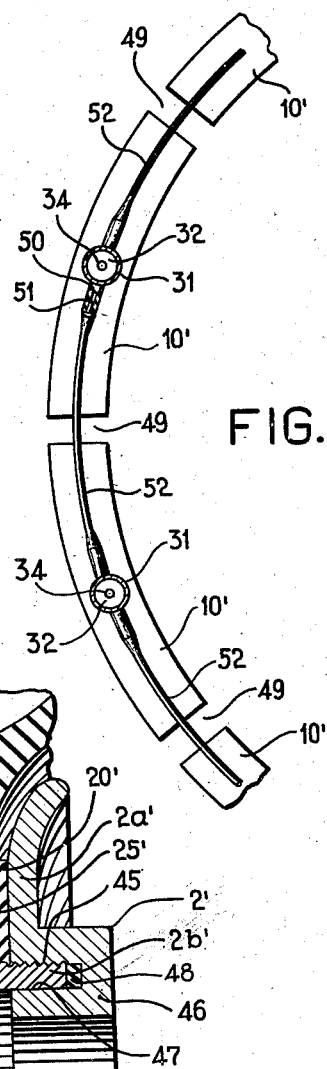
FIG. 3
FIG. 5
FIG. 4
Inventor,
Arnoldo G. Guzik
By Young, Emery & Thompson
Attys.

Patented June 22, 1948

2,443,955

UNITED STATES PATENT OFFICE 2,443,955

DEVICE FOR USE IN RETREADING AND VULCANIZING PNEUMATIC TIRES

Arnoldo Gunther Guzik, Vicente Lopez, Argentina

Application April 16, 1946, Serial No. 662,629

5 Claims. (Cl. 18—18)

The present invention relates to devices for use in repairing and vulcanizing pneumatic tires and more particularly to chambers of the kind adapted to contain a fluid, for example air, under pressure. One common instance of the general type of chamber herein contemplated is the inner tube of pneumatic tires for road vehicles. Another instance is the air-bag or air-chamber used in tire re-treading and vulcanizing operations. These specific instances are, however, mentioned only by way of indicating the general type of pressure air chamber with which my invention is concerned, and not as in any way delimiting or restricting the wide field in which my novel structure may be usefully employed as will be clear to those skilled in the art.

One of the principal drawbacks of the known air-chambers is that, since they are made of a distensible rubber or the like material sometimes reinforced with sheets of textiles, when these chambers are used under conditions under which they are exposed to relatively high temperatures they soon deteriorate and must be discarded.

In contradistinction to this known construction in which the pressure fluid chamber is made wholly of flexible and relatively perishable materials, my structure comprises a hollow member which may be non-rigid and which has an opening and closure means for the opening made, substantially entirely, of rigid or substantially rigid heat and abrasion resisting materials, such as metals. Hence my novel structure has practically unlimited durability so that the user is saved the expense and trouble of having from time to time to replace a pressure fluid chamber separable from the hollow member. The importance of this saving may be gathered from the fact that the air-chambers used in retreading tires have a useful life of only thirty or forty applications, whereas by adopting my novel closure, such separable air chambers may be dispensed with and replaced by a very durable closure structure applicable directly to the outer cover.

Furthermore by adopting the structure of the present invention it is possible to eliminate the inner tubes of pneumatic tires for vehicles with the consequent saving in replacement expenses.

It is therefore a principal object of the present invention to provide a durable, heat and abrasion resisting closure structure associable with a hollow member to form a pressure fluid chamber structure, whereby the use of distensible rubber and the like chambers may be eliminated.

It is a further object of the invention to provide improved closure means for a pressure fluid chamber structure, composed of substantially rigid material and adapted to be used in direct combination with a hollow ring like member such as an outer tire cover or the like.

Another object of the invention is to provide a pressure fluid chamber comprising in combination a hollow ring-like member having an opening along the inner periphery of said member, a pair of opposed lips defining said opening, closure means for the opening including outer and inner clamping members for the lips, impervious means associated with the clamping means for isolating the interior of the hollow member from the surrounding atmosphere, pressure means for establishing clamping engagement of the lips by the clamping means and outer means for introducing pressure fluid into the hollow of the ring like member.

These and other objects and advantages of the present invention will become apparent in the course of the following detailed description of a preferred embodiment thereof illustrated in the accompanying drawings in which:

Fig. 3 is a fragmentary sectional view of a pressure fluid structure incorporating a modified form of closure means.

Fig. 4 is a fragmentary sectional view of the same structure shown in Fig. 3 but in an enlarged scale and in operative position, and Fig. 5 is a diagram showing one arrangement of the inner clamping members of the closure means of Fig. 3.

Figure 1:
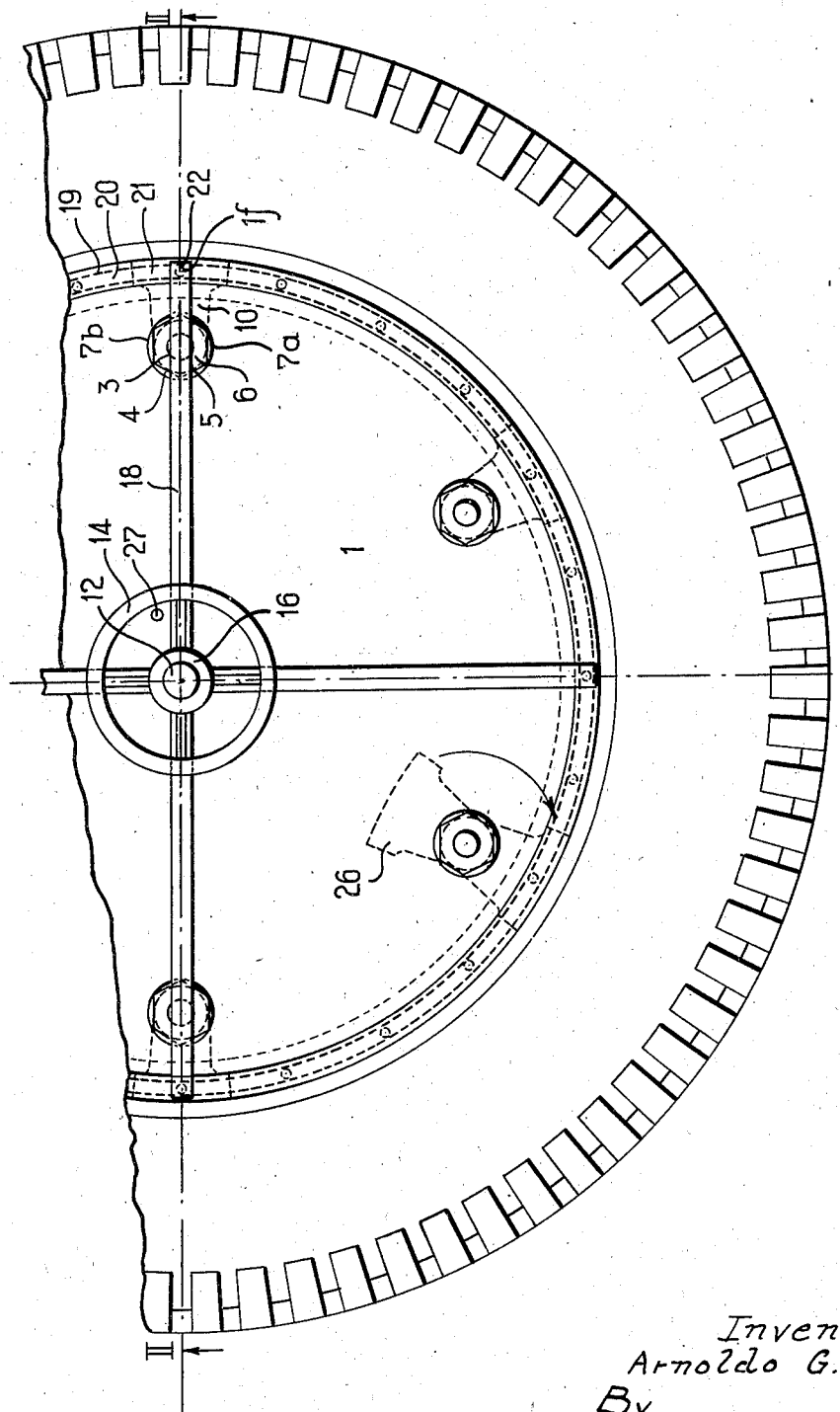
Fig. 1 is a fragmentary side view of a pressure fluid structure showing my novel closure as applied to an outer tire cover for retreading.
Figure 2:
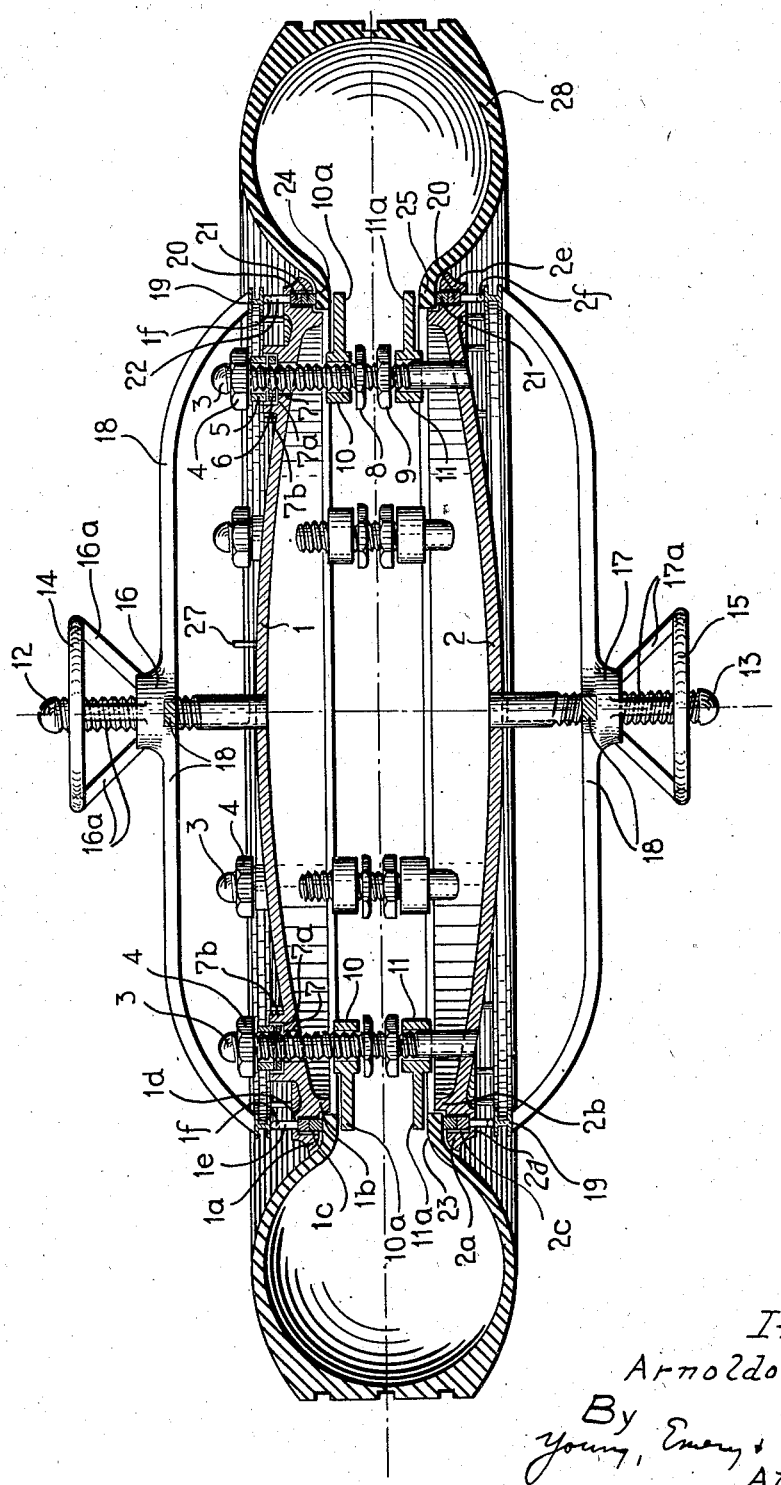
Fig. 2 is a section of the assembly of Fig. 1 on the line II—II of Fig. 1.

Referring first to Figs. 1 and 2 I have there shown an embodiment particularly suitable for use as an air chamber in connection with retreading operations so that the centre portion of the device is imperforate.

With this in mind, the particular embodiment shown in Figs. 1 and 2 will now be described. As shown the closure means comprises essentially two dished plates or discs 1 and 2 forming the outer clamping members hereinbefore mentioned. Said plates 1 and 2 are adapted to be assembled together by means of a plurality, for example six, of stems 3 projecting from one of the plates, for instance the plate 2, said stems being screw threaded to receive clamping nuts 4, as well as locking nuts 8 and 9 for a purpose to be hereinafter explained.

Said stems project from the concave face of the plate 2, and preferably do not project substantially from the other face. They should be evenly distributed around the plate 2.

To receive the stems 3, the other plate 1 has a like plurality of perforations 7 which on the convex side of plate 1 communicate with flat bottomed recesses 7a in a like number of bosses 7b, which recesses are of larger diameter than the stems 3, to accommodate a sealing washer 6 and a spacer ring 5 interposed between the clamping nut 4 and said sealing washer 6.

The peripheral edges 1a, 2a of the plates 1 and 2 are shaped to fit the outside of the lips or beads 24 and 25 of the hollow ring like member, here shown as a tire 28. Inwardly of the shaped edges 1a, 2a, the plates 1 and 2 have an annular abutment shoulder 1b, 2b, against which the inner periphery of the lips or beads 24, 25 are adapted to rest.

Formed on the inside of each plate between the shaped edge portions 1a, 2a and the abutment shoulder 1b, 2b, is a circular groove 1c, 2c in which are accommodated, first, a compression ring 20 of some suitable hard material such as mild steel, and then, a sealing ring 21 of a material adapted to provide under pressure a fluid tight seal between said ring 21 and the outer faces of the beads 24, 25.

To enable pressure to be applied through the compression ring 20 to the sealing ring 21, by operations from outside the chamber structure, I provide for each plate 1, 2, a spider including a central hub portion 16, 17 to one side of which extend spokes 16a, 17a adapted to support a rim 14, 15 whereby the spider may be actuated.

To the other side of the hub 16, 17 extend the curved ends of radial arms 18 which curved ends support, and in the embodiment shown, are integral with a pressure ring 19 in contact with a plurality of pins 22 which are each a sliding fit in perforations 1d, 2d, spaced around an annular projection 1e, 2e, formed on the outside of the plates 1, 2 over the portion occupied on the inside by the groove 1c, so that said pins 22 extend into said groove into contact with the compression ring 20.

The spiders are adapted to be supported on screw threaded steams 12, 13 projecting from the convex surface of the plates 1, 2 so that by turning the spiders by means of the rims 14, 15, the pressure rings 19 may be moved towards and away from the annular projections 1e, 2e to urge th pins 22 into the perforations 1d, 2d or to release the thrust thereon.

It will be noted that for this purpose the rings 19 must, at least in the inward movement slide circularly over the ends of the pins 22. In order to minimize friction said pins may at said ends be provided with balls 1f, 2f, secured thereto in any convenient well known manner.

To provide support for the face of the beads 24, 25 remote from the sealing ring 20, inner clamping members are provided comprising in this instance collars 10, 11 having projecting tongues 10a, 11a, which are freely mounted on the stems 3. To secure these collars in a desired operative position I provide the aforementioned locking nuts 8 and 9. To allow of the introduction of pressure fluid between the plates 1 and 2 I provide a valved inlet 27 at some suitable point on one or both plates 1, 2.

In assembling the structure I use the plate 2 from which the pins 3 project as the base and with the tongues 10a, 11a of collars 10, 11 turned towards the center of the plate 2 (as indicated at 26 in Fig. 1) I place one lip or bead 25 of the hollow ring like member against the shaped portion 2a and the abutment shoulder 2b. Thereupon the collars 11 are rotated until the tongues 11a overlie the inner face 23 of said bead 25. The locking nuts 9 are then tightened until the bead 25 is firmly gripped between the tongues 11a and the shaped peripheral marginal portion 2a of the plate 2.

The collars 10 are then turned until the tongues 10a are brought under the other lip or bead 24 and the nuts 8 are tightened against said collars 10 so that the tongues 10a exert some laterally outward pressure against the bead 24.

Thereupon the other plate 1 is placed in position on the stems 3. The sealing washers 6, collars 5 and nuts 4 are located thereon and the nuts 4 tightened whereby the two plates are urged towards each other and the shaped peripheral marginal portion 1a of the plate 1 is pressed closely against the outside of the bead 24, which is backed at circumferentially spaced points by the tongues 10a.

Finally the spiders are rotated to cause pressure to be exerted as hereinabove set forth on the sealing rings 21 and thereby ensure a fluid tight closure between the edges of the plates and the beads of the hollow ring like member or tire 28.

It will be clear from the foregoing that the whole assembly comprising the plates 1 and 2 and the tire 28 forms a fluid tight enclosure so that if a pressure fluid such as air be pumped or otherwise fed into the enclosure through the valved stem 27, such pressure fluid will remain inside the assembly and if the hollow ring like member is relatively flexible and inflatable, as in the example shown, will adequately support member 28.

Referring now to Figs. 3 and 4, I have here shown a modified embodiment of the closure means, applied by way of example, as before to a tire. It will be observed that this embodiment is more particularly adapted for use in connection with road wheels, although it may, of course, be employed for other purposes as well.

As shown, the bead portions 24', 25' of the tire 28' abut against shoulders 1b', 2b' formed in one of the outer clamping members 1', 2', for example in the member 1', and to be gripped between flanges or peripheral edges 1a', 2a' of said outer clamping members and inner clamping members 10', 11' respectively. Said inner clamping members 10', 11' form part of an inner clamping assembly 29 which in the inoperative position shown in Fig. 3, is retracted into a central channel shaped recess 30 of said one outer clamping member 1', and in the operative position, is adapted to be moved outwardly to bring the inner clamping members 10', 11' opposite the inner faces 23' of the lips or beads 24', 25'.

Said inner clamping assembly 29 as best seen in Fig. 4 comprises a transverse cylinder 31 disposed parallel to the axis of the whole structure, and a pair of opposite piston members 32, 33 the ends of which outside the cylinder 31 carry arcuate plates forming the inner clamping members 10', 11'. The piston members 32, 33 are normally held in retracted position with the clamping members 10', 11' close to the ends of the cylinder 31 by means of a light tension spring 34, the strength of which should be just sufficient to retract the pistons against friction.

Depending centrally and radially from the cylinder 31 is a fluid inlet tube 35 having a bore 36 communicating with the interior of the cylinder 31 between the inner ends of the pistons 32, 33. The end of the tube 35 remote from the cylinder is internally shaped to receive a nonreturn valve 37 of any convenient well known type, such as those used for automobile tires.

The tube 35 is guided in the bore 38 of an externally screw threaded boss 39 formed on the outer peripheral surface 40 of the channel 30, so that said boss lies outside the channel and projects towards the center of the whole structure.

The boss 39 is adapted to have screwed thereon an internally screw threaded cap 41 containing a sealing washer 42, and having an external connection nipple 43 for receiving the delivering end of a pressure fluid supply means. A closure cap 44 for said nipple is also desirably provided.

Turning now to the outer clamping members, the member 1' is of stepped cross-section, and, as already stated comprises the flange 1a', the shoulder 1b', the channel 30 and the flange 2b'. This second flange 2b' has an outer marginal screw threaded portion 45 to receive the second outer clamping member 2'.

The clamping member 2' comprises an annular body portion 46 having a cylindrical recess 47 on the side face from which the flange 2a' projects radially outwards. The outer wall of the cylindrical recess is screw threaded to engage the portion 45 of the flange 2b'. Conveniently a compressible annular washer 48 is positioned in the bottom of the recess 47.

The arcuate inner clamping members conveniently extend each over a considerable length circumferentially of the inner faces 23 of the lips or beads 24', 25' of the hollow ring like member 28'. It will be understood that a plurality of pairs of inner clamping members as well as a plurality of actuating means or clamping assemblies will be provided suitably distributed around the channel 30 so that when the inner clamping members are in operative position there will be a minimum of space 49 (see Fig. 5) between their ends.

As shown in Fig. 3 all of the clamping assemblies 29 have a fluid inlet tube 35 but I may provide only one clamping assembly having such a tube in which event all of the cylinders 31 would be interconnected. Such an arrangement is diagrammatically illustrated in Fig. 5 in which the cylinders 31 have laterally projecting tubes 50 having bores 51 communicating with the interior of the cylinder between the pistons, said tubes 50 being interconnected in pairs as by rubber tubing 52.

As so far described this modified form of closure means may be applied in connection with retreading and/or vulcanizing operations.

I may however readily adapt this structure to act as a wheel adapted to be bolted or otherwise secured to a shaft or axle, by providing a dished or offset circular web 53 (Fig. 3) the central portion 54 of which would be flattened to permit it to be secured, for example, to the flange 55 of a shaft 56, as by studs 57 and nuts 58.

The closure means according to Figs. 3 and 4 are applied to the hollow ring like member as follows:

The clamping assemblies 29 are supposed in their retracted or lower positions and the pistons 32, 33 in their retracted or inner positions. The annular outer clamping member 2' may be entirely removed or slacked off to allow of easier insertion of the lips 24', 25' into the space defined by the flanges 1a' and 2a'. When the hollow member or tire 28' has been positioned the annular outer clamping member is screwed into clamping position whereupon the clamping assemblies 29 are moved (manually) into their raised or operative positions and the caps 41 screwed on to the bosses 39 to hold the assemblies 29 in said operative position and to provide a fluid tight closure over the bosses 39.

Pressure fluid supply means are then connected to nipple 43 of each tube 35 (if there are more than one) in turn or simultaneously and pressure fluid is supplied to the interior of the respective cylinders 31. The pressure fluid urges the pistons 32 and 33 against the slight opposition of the spring 34, outwardly whereby the inner clamping members 10' and 11' are tightly pressed against the inner faces 23' of the lips or beads 24', 25, thereby effectively sealing off the entire space within the hollow member and the closure means, from the outside fluid medium, such as air, surrounding the structure.

Depending on the particular design adopted, as explained hereinabove, the said space is then filled with pressure fluid either through a separate inlet or by continuing the supply through one or more of the valved tubes 35.

It will be observed as best seen from Fig. 4, that fluid tight seals are established at all necessary contact areas. The compressible members 20' seal off the contact between themselves and the outer faces of the lips 24', 25' and the inner faces of the outer clamping members 1a', 2a'. The valve 37 and the washer 42 seal off the bores 36 and 38 of the tube 35 and the boss 39 respectively, and, to ensure that in no circumstances there shall be a leak past the screw connection 45 between the shoulder 2b' and the outer clamping member 2', the gasket or sealing ring 48 is provided.

Hence, once the closure is operative it will hold in the pressure fluid in the aforementioned space for a relatively long period even under exacting conditions of use. Moreover the essential and more expensive parts of the closure, that is to say the outer and inner clamping members and the clamping assemblies, can readily be made of heat and wear resisting substantially non-perishable materials such as metal, plastics and the like.

The closure means hereinabove described may be used as means for maintaining an outer tire cover or similar structure under pneumatic pressure during such operations as revulcanizing and/or retreading or during service as a tire for road wheels and the like, or for analogous purposes, and it will be observed that, as regards the closure means with their associated parts, all of the members thereof may be made of any heat and wear resisting material having the necessary rigidity. Thus there is no danger of deterioration due to the effect of the temperatures used in vulcanizing or retreading, and when adapted for use as road wheels the structure comprising my novel closure means, will entirely eliminate the troublesome, costly and perishable inner tubes.

Although I have described my improved closure means for pressure fluid chambers with particular reference to certain specific embodiments thereof I do not intend to be limited thereto but may, in addition to those already noted, make sundry modifications in the details and application of the closer structure without thereby departing from the spirit and scope of the present invention as defined in the acompanying claims.

I claim:

1. A device for use in repairing or retreading a pneumatic tire opening comprising a pair of spaced dished plates having their concave sides facing each other, a plurality of circumferentially spaced screwed stems projecting from the concave face of one of said plates, a like plurality of circumferentially spaced perforations in the other plate, said stems passing through said perforations, adjustable inner bead clamping means on the portion of said stems lying between said plates, recessed bosses surrounding each perforation on the convex side of the respective plate, fluid-tight sealing means in said recessed bosses, a peripheral marginal portion on the concave side of each plate, constituting an outer clamping member, said marginal portion being shaped to fit the respective bead, compressing means on said stems on the side of the sealing means remote from the plate, said compressing means when in operative position acting to cause the beads to be tightly gripped between the respective inner and outer clamping means, an annular groove in each plate adjacent said outer clamping means, ring-like sealing means in said groove, said plates having a plurality of circumferentially spaced holes therein establishing communication between said grooves and the convex side of the plates, a screwed stem projecting centrally from the convex face of each plate, a spider mounted for screw adjustment on each of said screwed stems, said spiders comprising radially extending arms for supporting a pressure ring over said plurality of holes, a pin in each hole one end of which contacts the ring-like sealing means and the other end contacts said pressure ring, whereby on screw adjustment of said spider the ring like sealing means is pressed against the respective lip of said surrounding member to form a fluid tight seal, and means in one of said plates for introducing pressure fluid into said structure.

2. A device for use in repairing or retreading a pneumatic tire and the like, and comprising a first dished plate, a second dished plate, coupling means projecting from the concave face of the first plate, adjustable inner bead clamping means on said coupling means, outer bead clamping means comprising a peripheral bead contacting portion on the concave side of each plate, cooperative means on the second plate for receiving said coupling means to couple the plates in spaced relationship with their concave sides facing each other, thereby to cause the beads of the tire to be gripped between the respective inner and outer clamping means and to define in combination with said hollow member a pressure fluid receiving space, annular sealing means in said outer clamping means, a pressure ring overlying said outer clamping means on the convex side of each plate, pressing means slidably located on each plate between said pressure ring and the annular sealing means, pressure ring adjusting means on the outside of each plate whereby pressure may be applied through said ring and said pressure means to said sealing means to effect a fluid tight seal around said beads and valved fluid inlet means in at least one of said plates.

3. A device for use in repairing or retreading a pneumatic tire comprising a first dished plate, a plurality of screw threaded stems projecting in circumferentially spaced relationship from the concave face of said plate at points adjacent the margin thereof, inner clamping means including pairs of collars having tongues and mounted to turn on said stems, pairs of locking nuts on said stems between the collars of each pair, a second dished plate having a like plurality of perforations disposed to register with and receive said stems, a recessed boss surrounding each perforation on the convex side of the second plate, a sealing washer and a spacer ring in said recesses, outer clamping means comprising a marginal bead engaging portion on the concave side of each plate having an annular groove therein, a clamping nut on the portion of the stems projecting from each boss, whereby the outer clamping means may be urged towards the inner clamping means to grip the respective bead of the tire in said bead-engaging portion, a sealing ring and a pressure ring in said groove, holes communicating said groove with the opposite face of the respective plate, a pressure pin slidable in each such hole, a screwed member projecting centrally from the convex face of each plate, a spider including a central boss in threaded engagement with said central member and having a handle, and radial arms projecting from said boss and having the ends thereof remote from the boss curved towards the respective plate and terminating in an annular pressure member engaging the ends of said pins remote from the pressure ring, and valved fluid inlet means in at least one of said plates, whereby in assembled condition a pressure fluid space is formed between the plates and including the interior of the tire said space being fluid tight and adapted to be charged with pressure fluid through said valved inlet means.

4. A device for use in repairing or retreading a pneumatic tire comprising a pair of spaced dished plates having their concave sides facing each other, a plurality of circumferentially spaced screwed stems projecting from the concave face of one of said plates, a like plurality of circumferentially spaced perforations in the other plate, said stems passing through said perforations, adjustable inner bead clamping means on the portion of said stems lying between said plates, a peripheral marginal portion on the concave side of each plate, constituting an outer clamping member, said marginal portion being shaped to complement the respective bead compressing means on said stems in the side of the sealing means remote from the plate, said compressing means when in operative position acting to cause the beads to be tightly gripped between the respective inner and outer clamping means, an annular groove in each plate adjacent said outer clamping means, ring-like sealing means in said groove, said plates having a plurality of circumferentially spaced holes therein establishing communication between said grooves and the convex side of the plates, a screwed stem projecting centrally from the convex face of each plate, a spider mounted for screw adjustment on each of said screwed stems, said spiders comprising radially extending arms supporting a pressure ring over said plurality of holes, a pin in each hole one end of which contacts the ring-like sealing means and the other end contacts said pressure ring, whereby on screw adjustment of said spider the ring-like sealing means is pressed against the respective bead of said surrounding member to form a fluid tight seal, and means in one of said plates for introducing pressure fluid into said structure.

5. A device for use in repairing or retreading a pneumatic tire comprising a first dished plate, a second dished plate, coupling means projecting from the concave face of the first plate, adjustable inner bead clamping means on said coupling means, outer bead clamping means comprising a peripheral bead contacting portion on the concave side of each plate, cooperative means on the second plate for receiving said coupling means to couple the plates in spaced relationship with their concave sides facing each other, thereby to cause the beads of the tire to be gripped between the respective inner and outer clamping means and to define in combination with said hollow member a pressure fluid receiving space, annular sealing means in said outer clamping means, a pressure ring overlying said outer clamping means on the convex side of each plate, pressing means slidably located on each plate between said pressure ring and the annular sealing means, pressure ring adjusting means on the outside of each plate whereby pressure may be applied through said ring and said pressure means to said sealing means to effect a fluid tight seal around said beads.

ARNOLDO GUNTHER GUZIK.

REFERENCES CITED

The following references are of record in the file of this patent:

UNITED STATES PATENTS

| Number | Name | Date |
|---|---|---|
| 1,528,659 | De Mattia | Mar. 3, 1925 |
| 1,637,599 | Ballew | Aug. 2, 1927 |
| 1,710,265 | Llewellyn | Apr. 23, 1929 |
| 1,734,766 | Fetter | Nov. 5, 1929 |
| 1,842,219 | Trautman | Jan. 19, 1932 |
| 1,842,315 | Conigrave | Jan. 19, 1932 |

FOREIGN PATENTS

| Number | Country | Date |
|---|---|---|
| 345,879 | France | 1904 |
| 707,078 | France | 1931 |